Nov. 14, 1950     J. S. BROD ET AL     2,529,539
SULFONATION OF UNSATURATED ESTERS
Filed July 13, 1948
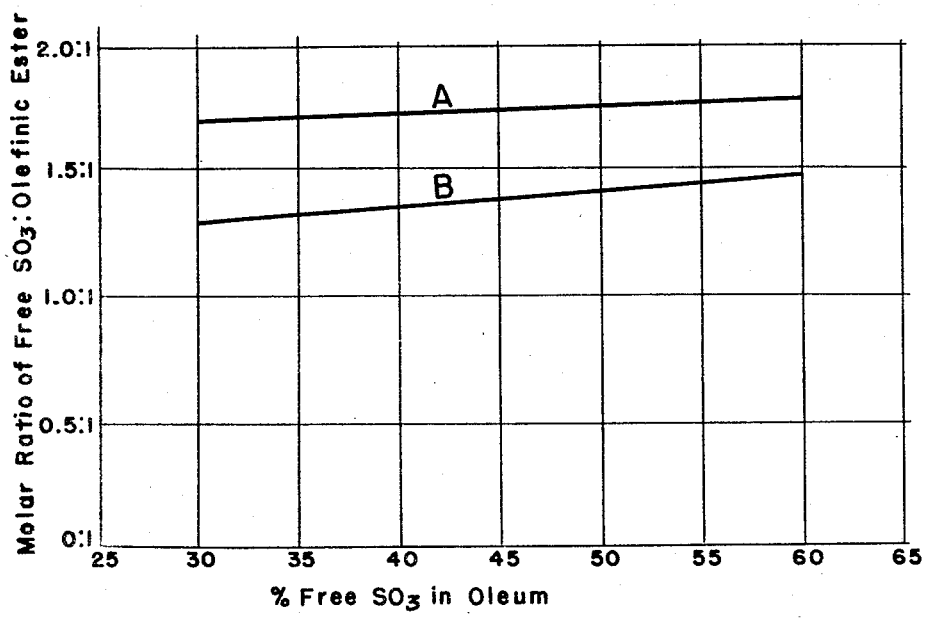
INVENTORS.
JOHN S. BROD
AND RONALD A. HENRY.
BY
ATTORNEYS.

Patented Nov. 14, 1950

2,529,539

UNITED STATES PATENT OFFICE 2,529,539

SULFONATION OF UNSATURATED ESTERS

John S. Brod, Wyoming, Ohio, and Ronald A. Henry, Inyokern, Calif., assignors to The Procter & Gamble Company, Cincinnati, Ohio, a corporation of Ohio Application July 13, 1948, Serial No. 38,407

19 Claims. (Cl. 260—400)

This invention relates to improvements in the process of sulfonating high molecular esters of olefinic alcohols and other non-ester sulfonatable organic compounds in the production of wetting, sudsing and washing agents.

In application Serial No. 38,405 of John S. Brod bearing even date herewith there is disclosed a process of producing wetting, sudsing and washing agents from esters of allyl alcohol with high molecular carboxylic acids, the process comprising reacting the allyl esters with oleum, the strength and amount of oleum lying within certain limits and certain precautions being taken in the sulfonation and also in the neutralization procedures, if neutralization is desired. These limits and precautions are briefly set forth hereinafter, and are more fully set forth in the aforesaid application. In Brod's process, organic diluents or thinning agents such as saturated aliphatic ethers, hydrocarbons and chlorinated hydrocarbons may be used to reduce the viscosity of the reaction mixture and to make the sulfonation less drastic.

As pointed out by Brod, if the strength of oleum is substantially greater than 60 per cent free SO₃, marked darkening of the sulfonation product results. On the other hand, if the strength of the oleum falls below about 30 per cent free SO₃, the degree of sulfonation of the allyl ester is decreased and the character of the product changes from being essentially monoglyceride sulfonate to progressively smaller proportions of sulfonate and progressively larger proportions of sulfuric acid ester, which latter is less stable than the sulfonate with respect to hydrolysis promoted by heat and acid. A high degree of sulfonation together with reasonably good color is attained with oleum containing between about 30 per cent and about 60 per cent free SO₃, provided the amount of oleum is such that the molar ratio of free SO₃ added: allyl ester lies between lines A and B in Figure 1 of Brod's application and provided the temperature of the reaction mixture is kept below 60° C., and further provided high local excesses of acid and local overheating of the mixture are avoided, as can be done by prompt, continuous and thorough mixing.

When we have employed the Brod process on a large scale in factory equipment such as is commonly used in sulfonation and sulfation processes, we have found that the viscosity of the reaction mixture is frequently so high that efficient handling and mixing are difficult, and that local overheating, local excesses of acid, discoloration, splitting of the ester linkages and low yields of sulfonated monoglyceride at times result. Adding glacial acetic acid or acetic anhydride as has been suggested heretofore (for example in U. S. Letters Patent 2,341,060) does not effectively decrease the viscosity nor lessen the difficulty of handling. While the thinning agents of Brod, especially ethylene dichloride, are beneficial they are not sufficiently so to eliminate the troubles encountered in factory operation.

It is an object of the present invention to improve the sulfonation procedure of Brod in order to increase the yields obtained thereby and to produce products of greater purity and efficiency and of better color. Another object is to provide sulfonation procedure which requires smaller amounts of and less concentrated sulfonating agents, and less careful temperature control. Another object is to provide a process whereby high molecular carboxylic acid esters of low molecular monohydric olefinic alcohols may be sulfonated at low cost to yield products of high sudsing, wetting and washing efficiency, which products are suitable for use without further purification. Another object is to provide a process whereby the excess sulfonating agent present but unused in sulfonating high molecular esters of low molecular olefinic alcohols may be used advantageously in preparing other wetting, sudsing and detergent agents from non-ester sulfonatable organic material. Another object is to provide a process whereby olefines may be sulfonated to give a high yield of useful product. Other objects will appear hereinafter.

Brod points out that by incorporating diluents or thinning agents such as ethylene dichloride in his oleum-allyl ester mixture, viscosity may be reduced and the chemical reaction rendered less drastic. We have found that certain low molecular saturated aliphatic esters are far more effective than ethylene dichloride for these purposes and that they differ from ethylene dichloride and all other thinning agents of which we have knowledge in their effect on the degree of sulfonation and in their protection of ester linkages against hydrolysis. For simplicity, we shall in large degree describe our invention as it is carried out with ethyl acetate, since this is our preferred diluent or thinning agent, but other low molecular saturated aliphatic esters such as methyl, ethyl, propyl, isopropyl and the isomeric butyl and amyl esters of acetic, propionic, butyric or isobutyric acids may also be used, and we therefore define the thinning agents which are suitable in practicing our invention as having the chemical formula $$R\overset{O}{\underset{\|}{C}}-OR'$$

in which R is an alkyl group of not less than one nor more than 3 carbon atoms and R' is an alkyl group of not less than one nor more than 5 carbon atoms. In general, the effectiveness of these esters tends to decrease with increasing length of the acyl chain.

The following examples illustrate ways in which

we practice our invention but it will be understood that these examples are illustrative only and that the invention is not limited to the details thereof, except as indicated in the appended claims. In the examples all parts are by weight and all materials were initially at room temperature.

*Example 1.*—The allyl esters of mixed fatty acids from hydrogenated coconut oil were sulfonated as follows in a reaction vessel which was externally cooled with ice water and which was equipped with an efficient stirrer having blades which scraped the sides and bottom of the vessel. One hundred twelve parts of oleum containing 60% free $SO_3$ and a solution of 100 parts of the allyl esters in 52 parts of methyl acetate were poured into the reaction vessel simultaneously, with continuous stirring, at such rates that the weight ratio of oleum:ester solution was at no time substantially more than 112:152, and that the temperature of the mixture was between 35° and 40° C. during the greater part of the reaction and at no time exceeded 40° C. At the end of the addition, the molar ratio of free sulfur trioxide added:allyl ester was 2.1:1. Within a few minutes after all of the reactants were added, neutralization was commenced by adding a portion of the acid mixture to 8 times its own weight of ice water and then neutralizing with 28% caustic soda until alkaline to methyl orange, whereupon further increments of acid mixture were added to the neutralized portion and neutralized in like manner until all of the acid mixture was neutralized. Analysis showed that 90.5% of the allyl ester was sulfonated. The product possessed great wetting, sudsing and washing power.

The methallyl ester of the mixed fatty acids of hydrogenated coconut oil may be substituted for the allyl ester in this example if desired.

*Example 2.*—One hundred parts of the allyl ester of hydrogenated coconut oil fatty acids were dissolved in 52 parts of ethyl acetate, and this solution and 112 parts of oleum containing 60% free sulfur trioxide were poured into the reaction vessel, reacted and neutralized by the procedure described in Example 1, regulating the rates of adding the reactants so that the weight ratio of oleum:ester solution was at no time substantially more than 112:152, keeping the temperature between 50° and 55° C. during the greater part of the reaction and at no time allowing it to exceed 55° C. At the end of the addition, the molar ratio of free sulfur trioxide added:allyl ester was 2.1:1. Analysis showed that 88.7% of the allyl ester was sulfonated. The product possessed great wetting, sudsing and washing power.

*Example 3.*—One hundred parts of the allyl ester of hydrogenated coconut oil fatty acids were dissolved in 51 parts of ethyl acetate, and this solution was sulfonated and neutralized as in Example 1, using 94 parts of 58% oleum, keeping the weight-ratio of oleum:allyl ester solution not greater than 94:151, and keeping the temperature between 35° and 40° C. during the greater part of the reaction and at no time allowing it to exceed 40° C. The molar ratio of free $SO_3$:allyl ester was 1.7:1. Analysis showed that 94.5% of the allyl ester was sulfonated. The product possessed great sudsing, wetting and washing power. The color of the product was lighter than in Examples 1 and 2, in which a higher ratio of free $SO_3$:allyl ester was used.

The coconut oil fatty acid ester of 3-butene-1-ol may be substituted for the allyl ester in this example with essentially similar results.

*Example 4.*—One hundred parts of distilled allyl ester of hydrogenated coconut oil fatty acids were dissolved in 50 parts of ethyl acetate, and this solution was sulfonated and neutralized as in Example 1, using 160 parts of 30% oleum, keeping the weight ratio of oleum:allyl ester solution not greater than 160:150, keeping the temperature between 40° and 45° C. during the greater part of the reaction and at no time allowing it to exceed 45° C. The molar ratio of free $SO_3$:allyl ester was 1.5:1. Analysis showed that 88% of the allyl ester was sulfonated.

The table below shows the effect of varying the amount of ethyl acetate in runs generally corresponding to those of Example 4, data for which are also included for comparison. It will be observed that as the amount of solvent decreases, the temperature attained increases, and this of course militates against a high degree of completeness of sulfonation.

| Parts of Allyl Ester | Parts of Ethyl Acetate | Weight Ratio, Oleum:Ester Solution | Temp., °C. | Per Cent $SO_3$ in Oleum | Molar Ratio, $SO_3$:Allyl Ester | Completeness of Sulfonation, Per Cent |
|---|---|---|---|---|---|---|
| 100 | 63 | 160:163 | 35–40 | 30 | 1.5:1 | 96 |
| 100 | 50 | 160:150 | 40–45 | 30 | 1.5:1 | 88 |
| 100 | 33 | 160:133 | 50–55 | 30 | 1.5:1 | 86 |
| 100 | 50 | 92:150 | 35–40 | 58 | 1.65:1 | 91 |
| 100 | 40 | 90:140 | 37–41 | 58 | 1.65:1 | 89 |
| 100 | 30 | 91:130 | 40 | 58 | 1.65:1 | 88 |

All of these products were light in color and possessed high sudsing, wetting and washing power.

*Example 5.*—One hundred parts of the allyl ester of hydrogenated coconut oil fatty acids were dissolved in 53 parts of isopropyl acetate, and this solution was sulfonated and neutralized as in Example 1, using 112 parts of 56% oleum, keeping the weight ratio of oleum:allyl ester solution not greater than 112:153, and keeping the temperature below 40° C. The molar ratio of free $SO_3$:allyl ester was 2.0:1. Analysis showed that 92.2% of the allyl ester was sulfonated. The product possessed high sudsing, wetting and washing power.

In a corresponding run in which n-butyl acetate was used in place of isopropyl acetate, 93.2% of the allyl ester was sulfonated, and in another corresponding run in which amyl acetate was used, 90.8% of the allyl ester was sulfonated. In both cases the products were light in color and possessed high sudsing, wetting and washing power.

*Example 6.*—One hundred parts of the allyl ester of hydrogenated coconut oil fatty acids were dissolved in 50 parts of ethyl propionate, and this solution was sulfonated and neutralized as in Example 1, using 95 parts of 58% oleum, keeping the weight ratio of oleum:allyl ester solution not greater than 95:150 and keeping the temperature below 40° C. The molar ratio of free $SO_3$:allyl ester was 1.7:1. Analysis showed that 89.9% of the allyl ester had been sulfonated. The product possessed high wetting, sudsing and washing power.

In a corresponding run in which ethyl butyrate was used in place of ethyl propionate, 88.6% of the allyl ester was sulfonated. In both cases, the color of the product was as light as with ethyl acetate.

When using our ester thinning agents, the most obvious effect is to reduce the viscosity of the sulfonation reaction mixture. Thus in sulfonating allyl laurate on a large scale under the optimum conditions of Brod as to strength and amount of acid (i. e. oleum containing about 60 per cent free $SO_3$, a molar ratio of free $SO_3$ added:allyl laurate from about 1.7:1 to about 2.3:1, and maximum sulfonating temperature below 50° C.), factory mixing equipment such as is commonly used in sulfonation processes frequently fails to effect satisfactory mixing, due to the high viscosity of the medium. By carrying out the reaction in the presence of ethyl acetate in an amount equal to about one third of the weight of the allyl ester, viscosity is reduced to below 1500 centipoises, measured at 40° C., and material of this viscosity can be handled conveniently in customary factory mixing devices. Ethyl acetate is approximately twice as effective as ethylene dichloride and far more effective than the other ether, hydrocarbon or chlorinated hydrocarbon thinning agents of which we have knowledge. The lower the ratio of free $SO_3$ added:allyl ester, the smaller will be the amount of ethyl acetate required to maintain a desired low viscosity. In general, we prefer that the weight of ethyl acetate be at least one fourth of the weight of the allyl ester to be sulfonated; because of the cost of ethyl acetate it is in general impractical that this ratio should exceed about 1:1.

In addition to, or because of, the decrease in viscosity caused by ethyl acetate and other low molecular esters, improved color and higher completeness of sulfonation result, even at temperatures higher than permissible in the absence of a thinning agent or in the presence of other known types of thinning agents, and furthermore, the amount of oleum required for sulfonation is reduced. These effects seem also to be closely related to the action of these low molecular esters in decreasing the degree to which the ester linkages of the allyl ester are split under the influence of the sulfonating acid, for it will readily be seen that the degree of splitting sets an upper limit upon the amount of sulfonated monoglyceride which can be formed by the reaction. Ethyl acetate and the other low molecular esters of our invention are distinguished from non-ester types of thinning agents in this respect, and we believe that the explanation is that the sulfonating acid is capable of causing only a limited amount of splitting of ester linkages and in doing so it fails to discriminate between allyl ester and ethyl acetate. Support for this belief is found in the appreciable proportions of diethyl sulfate and sodium ethyl sulfate present in the finished product, as indicated by analysis. The presence of these products appears to have no adverse effect on the color or surface-active properties of the monoglyceride sulfonate produced by our process. It will be seen from this discussion that our low molecular ester diluents are in a class by themselves with reference to their effect upon the course of the chemical reaction and to the efficiency of the products obtained.

For maximum completeness of sulfonation with oleum containing from 55 to 60 per cent free $SO_3$, the optimum molar ratio of free $SO_3$ added:allyl ester is from about 1.5:1 to about 1.8:1 in the presence of ethyl acetate, as compared with an optimum ratio of from about 1.7:1 to about 2.3:1 in the presence of ethylene dichloride. Using oleum of this strength and operating within the above 1.5:1 to 1.8:1 ratio range and at temperatures below 65° C., about 3 per cent to 5 per cent more of allyl ester is normally sulfonated in the presence of ethyl acetate than in its absence or in the presence of ethylene dichloride. When oleum of 30 per cent $SO_3$ content is used in an amount such that the molar ratio of free $SO_3$ added:allyl ester is from about 1.3:1 to about 1.7:1 (i. e., the preferred range of ratios), use of ethyl acetate normally increases by from 10 per cent to 20 per cent the degree of sulfonation attained.

Ethyl acetate may be used as a medium to which oleum and allyl ester are added, or allyl ester may first be dissolved in the ethyl acetate before the acid is added, or a portion of the ethyl acetate may first be introduced into the vessel in which the reaction is to take place and the oleum and a solution of allyl ester in the remainder of the solvent may then be added thereto. Thus the oleum may be added slowly to the allyl ester solution; or the allyl ester solution may be added to a batch of pre-formed acid reaction mixture to which the required amount of additional oleum is later added; or concurrently flowing streams of ester solution and of oleum in the desired proportions may be mixed with one another, or additional amounts of both ester solution and oleum may be added to this acid reaction mixture; or the concurrently flowing streams of ester solution and oleum may be so proportioned that less than the desired amount of oleum is initially admitted, one or more supplementary streams of oleum being later mixed with the acid reaction mixture after the initial reaction has taken place, thereby increasing the total added oleum to the desired proportion. It will be perceived that there is wide latitude in the mode of adding and mixing the constituents, subject to the general principles that the reaction may be initiated by a very small proportion of acid, that large excesses of acid over ester are at all times to be avoided, and that in order to effect a high degree of sulfonation some excess of acid must finally be present.

In accordance with these principles, we have found that in using oleum containing about 30 per cent free $SO_3$, the oleum should be added in such manner and amount that the molar ratio of free $SO_3$ added:allyl ester should at no time during the addition exceed about 1.7:1 and should be at least 1.3:1 when all of the acid has been added. Similarly in using oleum containing about 60 per cent free $SO_3$ (the strength which we prefer), this ratio should at no time during the addition exceed about 1.8:1 and should be at least 1:5.1 when all of the acid has been added. With oleums of intermediate strengths, the allowable ratios will vary correspondingly.

These limitations are graphically shown in Fig. 1, wherein the molar ratio of free $SO_3$ added:olefinic ester is plotted on the ordinate scale and the strength of the oleum, expressed as the % free $SO_3$ therein, is plotted on the abscissa scale. The oleum should be added to the ester in such manner and amount that this molar ratio, when plotted, shall lie between lines A and B when all of the acid has been added, although during the course of the addition it is required only that this ratio shall not be above the line A.

In practicing our invention, artificial or external cooling is commonly employed in order to restrain the temperature from rising substantially above 65° C. during the sulfonation reaction, and/or the reactants are added slowly so that the heat of reaction is readily dissipated. Prompt, rapid and thorough mixing is requisite to good results.

Sulfonation occurs rapidly in our process. Usually only a few minutes, rarely more than 10 or 15, are allowed after mixing the reagents before the next step in the process, which is to neutralize the acid mixture.

Neutralization may be with alkali hydroxides, alkaline salts, oxides or hydroxides of alkaline earths or of heavy metals, ammonia or organic bases. For most purposes, the neutralizing agent should be such as to form water-soluble salts of the sulfonated material, and sodium hydroxide or the alkaline salts thereof are commonly used. Since high temperature and an alkaline reaction favor splitting the allyl ester or its sulfonated product at the carboxylic linkage, it is advisable to restrain the temperature from rising substantially above 50° C. during neutralization, and to add the alkali to the acid mixture with efficient stirring at such rate that at no time is the mixture substantially alkaline. Temperature control may be effected in various ways, such for example as by external or artificial cooling, or by neutralizing in the presence of a large proportion of previously neutralized material, or by coupling such procedure with artificial cooling. The pH of the neutralized product should not substantially exceed 7. Satisfactory stability of product results over the pH range from about 4.5 to about 7.0.

While we have limited our description largely to sulfonation of allyl esters, esters of other low molecular olefinic monohydric alcohols may be employed, the term "low molecular alcohols" being used herein to designate alcohols containing not more than 6 carbon atoms. Examples of such alcohols are methyally, ethallyl, crotyl and 2-methyl crotyl alcohols, gamma chlorallyl alcohol, methyl vinyl carbinol, 3-methyl-3-butene-1-ol, 4-pentene-1-ol, 4-methyl-4-pentene-1-ol, 3,3-dimethyl-3-propene-1-ol, 2 - chloro-3-butene-1-ol, 1-chloro-3-butene-2-ol, 3-butene-1-ol, and the like. Particularly useful products have been obtained from the esters of allyl alcohol.

The acid portion of the olefinic esters may be the acyl group of soap-forming high molecular monocarboxylic acids, the term "high molecular acids" being used herein to designate acids containing from about 8 to about 22 carbon atoms. The types of acids which are suitable are more fully described in the copending application of Brod. The acids of oils of the coconut oil group are especially suitable, this being a group of tropical nut oils, such as coconut, babassu and palm kernel oils, characterized by their high lauric and myristic acid content and described by Lewkowitsch in "Chemical Technology and Analysis of Oils, Fats and Waxes", Sixth Edition, pages 500 and 617. Esters of substantially saturated acids are preferred, since oxidation and discoloration frequently occur when esters of highly unsaturated acids are used. In general, good results have been obtained when the iodine value of the fatty acid is less than 25.

Using the amounts and concentrations of oleum specified hereinbefore, a considerable excess of acid normally remains unreacted with the olefinic ester. This excess acid will not satisfactorily sulfonate additional amounts of olefinic esters, yet it possesses marked sulfonating power toward certain other sulfonatable organic material, and as a result the acid reaction mixture at the completion of the previously described process can be used to prepare further amounts of valuable wetting, sudsing and washing agents as disclosed in copending application of Henry and Brod (Serial No. 38,406). For this purpose we may add to the acid reaction mixture non-ester sulfonatable organic compounds such as high molecular primary or secondary aliphatic monohydric alcohols of from about 8 to about 18 carbon atoms, for example the primary alcohols derived from natural fatty esters such as coconut oil or other oils of the coconut oil group, or high molecular olefines of from about 8 to about 30 carbon atoms, for example those which can be derived from petroleum sources or by hydrogenation of carbon monoxide or by polymerization of alkylenes, and particularly straight chain olefines and those having a double bond at the end of the chain. Olefines containing from about 12 to about 18 carbon atoms are in general preferred because of the greater efficiency of their sulfonated products.

When the residual sulfonating power is being thus exploited, the use of low molecular esters as thinning agents is especially desirable, the amount required for effective action being approximately the same whether or not other non-ester sulfonatable organic matter is added. In the case of olefines in particular, use of ethyl acetate causes a higher degree of sulfonation and better color, reduces the amount of oleum required and permits a wider range of operational temperatures. Furthermore, in the absence of thinner or in the presence of ethylene dichloride, appreciable amounts of high molecular dialkyl sulfate are formed during the reaction, whereas the amount formed in the presence of ethyl acetate is negligible.

In practicing this modification of our invention, it is advised that the weight of added sulfonatable organic matter, whether alcohol or olefine, shall not substantially exceed the weight of the olefinic ester.

The following examples illustrate in greater detail ways in which we practice this modification of our invention.

*Example 7.*—One hundred parts of the allyl ester of mixed fatty acids from hydrogenated coconut oil were added to 50 parts of ethyl acetate and the mixture was sulfonated as in Example 1, using 160 parts of 30% oleum, keeping the weight ratio of oleum:allyl ester solution not greater than 160:150 and keeping the temperature between 35° and 40° C. The molar ratio of free $SO_3$:ester was 1.5:1. To this acid mixture there was added rapidly and with constant stirring 40 parts of a technical grade of oleyl alcohol having an iodine value of 88, during which addition the temperature was kept between 30° and 40° C. The reaction mixture was then neutralized as in Example 1. Analysis showed that 87% of the total ester plus alcohol had been sulfonated. The product possessed high wetting, foaming, emulsifying and washing properties.

*Example 8.*—One hundred parts of the allyl ester of mixed fatty acids of coconut oil were added to 50 parts of ethyl acetate and the mixture was sulfonated as in Example 1, using 116 parts of 58% oleum, keeping the weight ratio of oleum:allyl ester solution not greater than 116:150 and keeping the temperature between 30° and 35° C. The molar ratio of free SO₃:ester was 2:1. To this acid mixture there were added slowly and with constant stirring 80 parts of hexadecene-1. The mixture was stirred for 2 minutes following this addition, during which time the temperature remained between 25° and 30° C. The reaction mixture was then neutralized as in Example 1. Analysis showed that 87.2% of the ester and 89.5% of the olefine had been sulfonated. The product possessed high sudsing, wetting and washing properties.

In Examples 7 and 8, the products were neutralized to a pH value higher than indicated by the color change of methyl orange but not higher than 6.5. Satisfactory products can, however, be made at a pH as high as 7.

Following neutralization, the sulfonated products may be treated in conventional manner to remove unsulfonated organic matter, inorganic salts, water, etc., or they may if desired be used without drying or further purification.

Having thus described our invention, what we claim and desire to secure by Letters Patent is:

1. A process of preparing wetting, sudsing and washing agents which comprises admixing an olefinic ester, said ester being that of a soap-forming high molecular monocarboxylic acid and a low molecular monohydric olefinic alcohol, with oleum to effect reaction therewith in the presence of a thinning agent having the chemical formula

wherein R is an alkyl group containing not less than one nor more than 3 carbon atoms and R' is an alkyl group containing not less than one nor more than 5 carbon atoms.

2. The process of claim 1 in which the thinning agent is ethyl acetate.

3. The process of claim 1 in which the weight ratio of thinning agent: olefinic ester is at least 1:4.

4. The process of claim 1 in which the acyl portion of the olefinic ester is the acyl group of a soap-forming monocarboxylic acid having from about 8 to about 22 carbon atoms and an iodine value not substantially above 25.

5. The process of claim 1 in which the acyl portion of the olefinic ester is the acyl group of fatty acids of an oil of the coconut oil group.

6. The process of claim 1 in which the olefinic ester is an ester of allyl alcohol.

7. The process of claim 1 in which the oleum contains by weight from 30 per cent to 60 per cent free sulfur trioxide and is added to the olefinic ester in the presence of the thinning agent in such manner and amount that the molar ratio of free sulfur trioxide added:olefinic ester lies above line B in Fig. 1 when all of the oleum has been added but at no time during the addition lies substantially above line A.

8. The process of claim 1 in which the oleum contains by weight about 60 per cent free sulfur trioxide and is added to the olefinic ester in the presence of the thinning agent in such manner and amount that the molar ratio of free sulfur trioxide added:olefinic ester is at least 1.5:1 when all of the acid has been added but at no time during the addition substantially exceeds 1.8:1.

9. The process of claim 1 in which the temperature of the reaction is restrained from rising substantially above 65° C. and in which, following reaction with oleum, the reaction mixture is neutralized at a temperature not substantially above 50° C. to form a water-soluble salt by adding an alkaline-reacting agent thereto in such manner and amount that the mixture is at no time substantially alkaline but has a pH above 4.5 at the conclusion of the neutralization.

10. The process of preparing wetting, sudsing and washing agents which comprises admixing an olefinic ester, said ester being that of a soap-forming high molecular monocarboxylic acid and a low molecular monohydric olefinic alcohol, in the presence of a thinning agent having the chemical formula shown in claim 1 with oleum which contains by weight from 30 per cent to 60 per cent free sulfur trioxide, thereby to effect reaction between said olefinic ester and said oleum, the oleum being added to the olefinic ester in the presence of the thinning agent in such manner and amount that the molar ratio of free sulfur trioxide added:olefinic ester lies above line B in Fig. 1 when all of the oleum has been added but at no time during the addition lies substantially above line A, restraining the temperature from rising substantially above 65° C. during the reaction, thereafter admixing with the acid mixture a non-tertiary aliphatic monohydric alcohol of about 8 to about 18 carbon atoms, thereby causing reaction of the acid mixture therewith.

11. The process of claim 10 in which the non-tertiary aliphatic monohydric alcohol is a primary alcohol containing from about 10 to about 18 carbon atoms.

12. The process of claim 10 in which the non-tertiary aliphatic monohydric alcohol is an alcohol obtained from an oil of the coconut oil group.

13. The process of preparing substantially neutral wetting, sudsing and washing agents which comprises admixing an olefinic ester, said ester being that of a soap-forming high molecular monocarboxylic acid and a low molecular monohydric olefinic alcohol, in the presence of a thinning agent having the chemical formula shown in claim 1 with oleum which contains by weight about 60 per cent free sulfur trioxide, thereby to effect reaction between said olefinic ester and said oleum, the oleum being added to the olefinic ester in the presence of the thinning agent in such manner and amount that the molar ratio of free sulfur trioxide added:olefinic ester is at least 1.5:1 when all of the oleum has been added but at no time during the addition substantially exceeds 1.8:1, restraining the temperature from rising substantially above 65° C. during the reaction, thereafter admixing with the acid mixture a non-tertiary aliphatic monohydric alcohol of about 8 to about 18 carbon atoms, thereby causing reaction of the acid mixture therewith, and neutralizing the product at a temperature not substantially above 50° C. to form a water-soluble salt by adding an alkaline-reacting reagent thereto in such manner and amount that the mixture is at no time substantially alkaline but has a pH above 4.5 at the conclusion of the neutralization.

14. The process of preparing substantially neutral wetting, sudsing and washing agents which comprises admixing the allyl ester of fatty acids of an oil of the coconut oil group with oleum in the presence of ethly acetate to effect reaction between said allyl ester and said oleum, the oleum containing about 60 per cent free sulfur trioxide and being used in such manner and amount that the molar ratio of free sulfur trioxide added:allyl ester is at least 1.5:1 when all of the oleum has been added but at no time during the addition substantially exceeds 1.8:1, the weight of the ethyl acetate being at least one fourth the weight of the allyl ester, restraining the temperature of the reaction mixture from rising substantially above 65° C. during the reaction, and neutralizing the reaction mixture to a pH between 4.5 and 7.0 by mixing therein a reagent of the group consisting of sodium hydroxide and the alkaline salts thereof in such manner that the pH of the mixture is at no time substantially greater than 7, while restraining the temperature from rising above 50° C.

15. The process of claim 10 in which the weight of non-tertiary aliphatic monohydric alcohol is not substantially more than the weight of olefinic ester, and in which the thinning agent is ethyl acetate.

16. The process of preparing wetting, sudsing and washing agents which comprises admixing an olefinic ester, said ester being that of a soap-forming high molecular monocarboxylic acid and a low molecular monohydric olefinic alcohol, in the presence of a thinning agent having the chemical formula shown in claim 1 with oleum which contains by weight from 30% to 60% free sulfur trioxide to effect reaction between said olefinic ester and said oleum, the oleum being added to the olefinic ester in the presence of the thinning agent in such manner and amount that the molar ratio of free sulfur trioxide added:olefinic ester lies above line B in Fig. 1 when all of the oleum has been added but at no time during the addition lies substantially above line A, restraining the temperature from rising substantially above 65° C. during the reaction, and thereafter admixing with the acid mixture an olefine of about 8 to about 30 carbon atoms, to cause reaction of the acid mixture therewith.

17. The process of claim 16 in which the olefine is a straight chain olefine of about 12 to about 18 carbon atoms, having the olefinic double bond in the alpha position.

18. The process of claim 16 in which the weight of olefine is not substantially more than the weight of olefinic ester, and in which the thinning agent is ethyl acetate.

19. The process of preparing substantially neutral wetting, sudsing and washing agents which comprises admixing an olefinic ester, said ester being that of a soap-forming high molecular monocarboxylic acid and a low molecular monohydric olefinic alcohol, in the presence of a thinning agent having the chemical formula shown in claim 1 with oleum which contains by weight about 60% free sulfur trioxide to effect reaction between said olefinic ester and said oleum, the oleum being added to the olefinic ester in the presence of the thinning agent in such manner and amount that the molar ratio of free sulfur trioxide added + olefinic ester is at least 1.5:1 when all of the oleum has been added but at no time during the addition substantially exceeds 1.8:1, restraining the temperature from rising substantially above 65° C. during the reaction, thereafter admixing with the acid mixture an olefine of about 8 to about 30 carbon atoms to cause reaction of the acid mixture therewith, and neutralizing the product at a temperature not substantially above 50° C. to form a water-soluble salt by adding an alkaline-reacting reagent thereto in such manner and amount that the mixture is at no time substantially alkaline but has a pH above 4.5 at the conclusion of the neutralization.

JOHN S. BROD.
RONALD A. HENRY.

REFERENCES CITED

The following references are of record in the file of this patent:

FOREIGN PATENTS

| Number | Country | Date |
|---|---|---|
| 296,999 | Great Britain | Sept. 26, 1929 |